United States Patent Office 3,425,975
Patented Feb. 4, 1969

3,425,975
AIR-DRYING FILM-FORMING COMPOSITIONS
Keith Edwin James Barrett, Windsor, England, assignor to Imperial Chemical Industries Limited, London, England, a corporation of Great Britain
No Drawing. Filed Sept. 23, 1964, Ser. No. 398,767
Claims priority, application Great Britain, Sept. 27, 1963, 38,225/65
U.S. Cl. 260—22                                       7 Claims
Int. Cl. C08g *39/06*

The present invention relates to improved film-forming compositions containing a natural or synthetic drying oil or other component which contains an air-drying unsaturated radical. The invention particularly relates to film-forming compositions which have improved air-drying properties and which provide hard, through-dried films.

In the formulation of film-forming compositions which, in the presence of atmospheric oxygen, provide hard, dry films, there is commonly included in the composition a natural or synthetic drying oil or other component which contains an unsaturated air-drying radical having two or more double bonds such as an unsaturated fatty acid radical.

The unmodified alkyd resins, for example, which themselves contain no oxygen-convertible groups, may be modified with drying or semi-drying oils such as linseed oil, dehydrated castor oil, tung oil or soya bean oil, to give satisfactory components for film-forming air-drying compositions which contain an unsaturated air-drying radical having two or more double bonds. The air-drying properties of these oil-modified alkyd compositions and other such oil-modified compositions will depend upon the particular oil used and the proportion of oil in the composition.

The natural and synthetic drying oils may be employed to impart air-drying properties to, or to modify the existing air-drying properties of other resins, as for example, the oleoresinous varnishes, the polyamide-imide resins and the epoxyesters.

In order to accelerate the rate of drying of the film-forming compositions which are based on the drying oils or on components which contain an air-drying unsaturated radical so that they dry at normal temperatures and in a comparatively short period of time to provide a hard film, it is necessary to add to the composition a "drier" or mixture of "driers." Such driers are compounds of certain metals, for example the naphthenates, oleates or octoates of lead, manganese, cobalt and calcium.

In the presence of the driers the surface of the film becomes touch-dry after an acceptable period of time but in the absence of lead the composition below the surface of the film tends to remain soft for a longer time. Thus when, for example, a cobalt drier alone is used the surface of the film dries rapidly but the body of the film does not through-dry and remains soft for long periods. When a cobalt drier is used together with a lead drier both the surface and the body of the film dry at an acceptable rate but there is still the disadvantage that the body of the film does not through-dry as rapidly as is usually desired. In addition there are several disadvantages associated with the use of a lead drier, such as for example, the toxicity and the tendency of such a drier to cause turbidity in the film.

We have now found that the through-drying of film-forming compositions which contain a natural or synthetic drying oil or other component containing an unsaturated air-drying radical having two or more ethylenically unsaturated groups and a metal drier salt can be improved. The improvement obtained is such that the use of a lead drier with its attendant disadvantages may, if desired, be avoided and the proportions of other metal drier salts kept to a minimum.

According to the present invention an improved film-forming composition comprises a natural or synthetic drying oil or other component containing an unsaturated air-drying radical having two or more ethylenically unsaturated groups, a metal drier salt and an involatile ethylenically unsaturated compound as herein defined.

Examples of the natural drying oils which are suitable include linseed oil, soya bean oil, tung oil, safflower seed oil, tobacco seed oil and cotton seed oil.

An example of a drying oil which is prepared from a natural oil is dehydrated castor oil.

An example of a suitable synthetic drying oil is the copolymer of butadiene and styrene, such as that sold under the registered trademark "Buton 100."

Examples of suitable film-forming components which contain an unsaturated air-drying radical having two or more ethylenically unsaturated groups include the oil-modified alkyd resins which may be modified for example, with linseed, soya bean, tung or dehydrated castor oils, the oleoresinous varnishes, the oil-modified polyamide-imide resins, the unsaturated fatty esters of the epoxy resins, the urethane oils and the urethane alkyds.

By an involatile ethylenically unsaturated polymerizable compound we mean a compound which when present as a component in the coating compositions of the present invention is not readily lost to the atmosphere by evaporation at room temperature while the film is drying, and which is capable of polymerizable or copolymerisation through the ethylenically unsaturated group.

The compounds which are included within this definition generally have a boiling point which is not appreciably less than and is generally greater than 200° C. They may be for example, simple, mono-functional unsaturated monomers such as for example, lauryl methacrylate, lauryl acrylate, N-butyl acrylamide, di-2-ethylhexyl fumarate or di-2-ethylhexyl itaconate. Alternatively they may be difunctional monomers such as for example, butane 1:4-diacrylate, or they may be monomers of higher functionality. Alternatively low molecular weight polymers which contain single or multiple unsaturation may also be used. Examples of such polymers include the acrylate or methacrylate esters of polyols and the addition polymers which contain pendant acrylate or methacrylate groups.

Linear polyesters containing acrylate or methacrylate end groups may also be used. These compounds may be employed as a single species or as a mixture depending upon the properties required of the composition.

When the involatile ethylenically unsaturated compound is a monomeric species it may comprise from 0.1% to 50% by weight of the total composition but it is preferred that the essential film-forming components of the composition comprise from 0.1–20% by weight of the ethylenically unsaturated polymerizable compound when a monomeric species and from 99.9–80% of the natural or synthetic drying oil or other component containing an unsaturated air-drying radical having two or more ethylenically unsaturated groups.

When the involatile ethylenically unsaturated polymerizable compound is a polymeric species it may be employed in proportions of from 0.1% to 90% by weight of the total amount of essential film-forming components in the composition.

There may be added to the composition other ethylenically unsaturated polymerizable compounds of boiling point significantly less than 200° C., but it is a disadvantage that while the curing composition is exposed to the atmosphere a proportion of these more volatile compounds may escape from the composition and the constitution of the resulting film is indefinitely related to that of the coating composition. Examples of such compounds of boiling point significantly less than 200° C., are ethyl acrylate, butyl acrylate and 2-ethylhexyl acrylate.

There may also be present such polymerizable or non-polymerizable volatile diluents as are required to obtain a film-forming composition having a viscosity suitable for application to a substrate.

It is essential to the successful working of the present invention that there should not be present in the composition amounts of any stabilizer of the antioxidant type or other additives in amounts which will adversely influence the air-oxidation of the film-forming composition.

By the term "metal drier salt" we mean those metal-containing salts which are conventionally used in the curing of surface coatings, such as for example, those containing cobalt, which act as redox catalyst and which are soluble in the composition.

I particularly prefer to use a salt of cobalt such as, cobalt naphthenate, cobalt octoate, or cobalt butyl phthalate.

The metal drier salt is used in an amount generally within the limits 0.001–2.0% by weight on the composition.

Alternatively, mixtures of the suitable metal drier salts may be used, or they may be used in a synergistic system.

The compositions of this invention are valuable as air-drying finishes which are required to form hard through-dried films, as for example, the air-drying decorative finishes.

Any of the additives conventionally used in the art of formulating surface coatings, as for example, pigments, fillers and extenders, may be incorporated into the present compositions.

The invention is illustrated by the following examples in which parts and percentages are by weight:

Example 1

A mixture of 100 parts of a linseed oil-modified alkyd resin, 10 parts of lauryl acrylate and 0.3 part of a solution of cobalt octoate in white spirit (containing 10% Co) was spread as a film onto the glass and allowed to dry in the presence of air at 25° C. A through-dried film was obtained in 3–4 hours. When the lauryl acrylate was omitted from the composition a through-dried film was only obtained after more than 12 hours.

Example 2

A mixture of 100 parts of a soya bean oil-modified alkyd resin, 10 parts of lauryl methacrylate and 0.3 part of cobalt octoate in white spirit (containing 10% Co) was spread as a film onto glass and allowed to dry in the presence of air at 25° C. A through-dried film was obtained in 5–6 hours. When the lauryl methacrylate was omitted from the composition a through-dried film was only obtained after more than 12 hours.

Example 3

A mixture of 90 parts of a linseed oil-modified alkyd, 10 parts of di-2-ethylhexyl fumarate and 2 parts of a solution of cobalt naphthenate in white spirit (containing 6% cobalt) was spread as a film onto glass and allowed to dry in the presence of air at 25° C. A through-dried film was obtained in 12 hours. In the absence of the di-2-ethylhexyl fumarate a through-dried film was obtained only after more than 20 hours.

Example 4

A mixture of 90 parts of a linseed oil-modified alkyd, 10 parts of di-2-ethylhexyl itaconate and 2 parts of a solution of cobalt naphthenate in white spirit provided a through-dried film in 9 hours by the procedure of Example 3. In the absence of the itaconate a through-dried film was obtained only after more than 12 hours.

Example 5

A mixture of 90 parts of a linseed oil-modified alkyd, 10 parts of butane 1:4-dimethacrylate and 2 parts of a solution of cobalt naphthenate in white spirit provided a through-dried film in 5 hours by the procedure of Example 3. In the absence of the dimethacrylate a through-dried film was obtained only after more than 12 hours

Example 6

A mixture of 50 parts of a linseed oil-modified alkyd, 50 parts of a resinous linear polyester methacrylate (prepared by the condensation of phthalic anhydride, ethylene glycol and methacrylic acid) and 2 parts of a solution of cobalt naphthenate in white spirit provided a through-dried film in 3 hours by the procedure of Example 3. In the absence of the linear polyester methacrylate a through-dried film was obtained only after more than 9 hours.

Example 7

A mixture of 80 parts of a copolymer of butadiene and styrene obtainable commercially as "Buton" 100, 20 parts of lauryl methacrylate and 2 parts of a solution of cobalt naphthenate in white spirit (containing 6% cobalt) was spread as a film onto glass and allowed to dry in the presence of air at 25° C. The film was set in 1 hour and was through-dried in 4 hours. It was flexible and tough and exhibited excellent adhesion.

In the absence of the lauryl methacrylate the mixture surface-dried in about 2 hours and a liquid underlayer of a thick film took from 3–4 days to through-dry.

Example 8

A mixture of 70 parts of "Buton" 100, 30 parts of ethylene glycol dimethacrylate and 2 parts of a solution of cobalt naphthenate in white spirit provided a film according to the procedure of Example 7 which was set in about 2 hours and had through-dried in 6 hours. The film was tough and hard and had good adhesion.

In the absence of the ethylene glycol dimethacrylate the mixture surface-dried in about 2 hours and a liquid underlayer of a thick film took from 3–4 days to through-dry.

Example 9

A mixture of 50 parts of linseed oil, 50 parts of a resinous linear polyester dimethacrylate prepared by the condensation of phthalic anhydride, ethylene glycol and methacrylic acid, and 2 parts of a solution of cobalt naphthenate in white spirit (containing 6% cobalt) was spread as a film onto glass and allowed to dry in the presence of air at 25° C. The film was through-dried in 6 hours. A similar film of linseed oil alone showed poor through-drying after more than 22 hours.

What I claim is:

1. An improved film-forming composition for air-drying applications at about ambient temperatures which comprises a natural or synthetic drying oil or other component containing an unsaturated air-drying radical having two or more ethylenically unsaturated groups, a metal drier salt and an ethylenically unsaturated compound which is substantially involatile at room temperature and which is capable of polymerization or copolymerization through the ethylenically unsaturated group, the monomer being an ester of acrylic or methacrylic acid with a higher alkanol or an alkene diol, an amide of acrylic or methacrylic acid, or a dialkyl ester of fumaric or itaconic acid.

2. An improved film-forming composition as claimed in claim 1 wherein the monomer is lauryl methacrylate, lauryl acrylate, N-butyl acrylamide, di-2-ethylhexyl fumarate, di-2-ethylhexyl itaconate or di-methacrylates of ethylene glycol and butane-1:4-diol.

3. An improved film-forming composition for air-drying applications at about ambient temperatures which comprises a natural or synthetic drying oil or other component containing an unsaturated air-drying radical having two or more ethylenically unsaturated groups, a metal drier salt and an ethylenically unsaturated compound which is substantially involatile at room temperature and which is capable of polymerization of copolymerization through the ethylenically unsaturated group, the involatile ethylenically unsaturated compound being a low molecular weight polymer of boiling point not less than 200° C.

4. An improved film-forming composition as claimed in claim 3 wherein the low molecular weight polymer is a polyol or a linear polyester containing acrylate or methacrylate groups.

5. An improved film-forming composition as claimed in claim 3 wherein the involatile ethylenically unsaturated compound comprises from 0.1 to 90% by weight of the film-forming components of the composition.

6. An improved film-forming composition for air-drying applications at about ambient temperatures which comprises a natural or synthetic drying oil or other component containing an unsaturated air-drying radical having two or more ethylenically unsaturated groups, a metal drier salt and an ethylenically unsaturated compound which is substantially involatile at room temperature, has a boiling point not less than 200° C., and which is capable of polymerization or copolymerization through the ethylenically unsaturated group, said composition also containing an ethylenically unsaturated polymerizable compound of boiling point less than 200° C.

7. An improved film-forming composition as claimed in claim 6 wherein the ethylenically unsaturated compound is ethyl acrylate, butyl acrylate or 2-ethylhexyl acrylate.

References Cited
UNITED STATES PATENTS

| | | | |
|---|---|---|---|
| 2,330,337 | 9/1943 | Cupery | 106—264 |
| 2,652,342 | 9/1953 | Gleason | 106—265 |
| 2,961,331 | 11/1960 | Wheeler | 106—264 |
| 3,055,766 | 9/1962 | Reinhardt | 106—264 |
| 3,139,411 | 6/1964 | Brockman et al. | 260—22 |
| 3,198,759 | 8/1965 | Schmidle | 260—22 |
| 3,243,309 | 3/1966 | Phillips et al. | 106—264 |
| 3,124,550 | 3/1964 | Salgado et al. | 260—22 |
| 3,166,431 | 1/1965 | Mulcaly | 106—264 |
| 3,190,878 | 6/1965 | Ikeda | 260—22 |

DONALD E. CZAJA, *Primary Examiner.*

R. W. GRIFFIN, *Assistant Examiner.*

U.S. Cl. X.R.

260—23, 23.7, 18, 40, 41, 41.5; 106—264; 117—124, 161, 167